April 5, 1949.

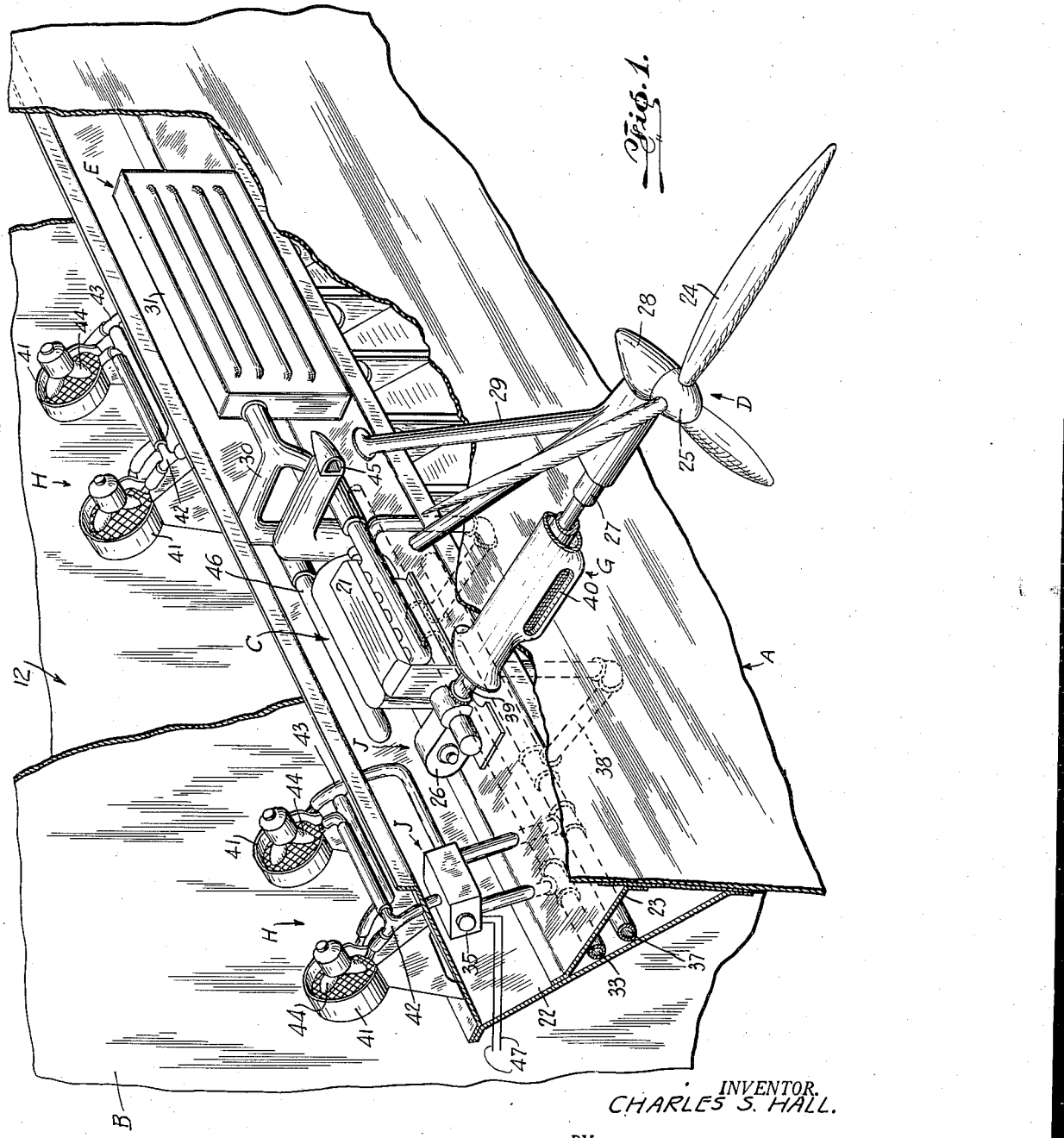

C. S. HALL 2,466,421

MEANS FOR VARYING THE BUOYANCY
OF LIGHTER-THAN-AIR CRAFT

Filed Sept. 4, 1945

INVENTOR.
CHARLES S. HALL.

BY Percy Freeman

ATTORNEY.

Patented Apr. 5, 1949

2,466,421

UNITED STATES PATENT OFFICE 2,466,421

MEANS FOR VARYING THE BUOYANCY OF LIGHTER-THAN-AIR CRAFT

Charles S. Hall, New York, N. Y.

Application September 4, 1945, Serial No. 614,315

3 Claims. (Cl. 244—97)

1

This invention relates to lighter-than-air craft and relates more particularly to means for controlling the temperature of the gas in the cells of an aircraft and, consequently, to control the buoyancy of said gas.

The type of aircraft particularly adapted for the present invention is the skin stressed metal type using helium as its buoyancy medium and propelled by swiveling and feathering propellers driven by a plurality of internal combustion liquid cooled engines. In craft of this type, the engines are located within the skin of the craft but outside the gas cells thereof so that they do not offer parasitic air resistance to the flight of the craft. Only the propellers, their support struts, and necessary radiator units are positioned outside of the aircraft skin.

An object of the present invention is to utilize the heat of the coolant liquid of the engines of an aircraft as indicated, for heating the gas in the cells of said aircraft to vary the buoyant properties of said gas.

Another object of the invention is to provide, in aircraft of the indicated type, means for directing the coolant liquid of the engines of said aircraft either to a radiator to be cooled therein, or to heaters serving the gas cells of said aircraft.

Another object of this invention is to provide, in aircraft of the indicated type, means for utilizing the heat in the coolant liquid of an engine of said aircraft for heating two or more gas cells of said aircraft.

A further object of the invention is to provide selective means for directing the coolant liquid of an engine of a lighter-than-air craft to one of a plurality of gas cells or to a device for cooling said coolant.

The invention also comprises novel details of construction and novel combination and arrangements of parts, which more fully appear in the course of the following description. However, the drawings merely show and the following description merely describes one embodiment of the present invention, which is here given by way of example or illustration only.

In the drawings:

Fig. 1 is a broken fragmentary perspective view of an at present preferred embodiment of the invention.

Figure 3:
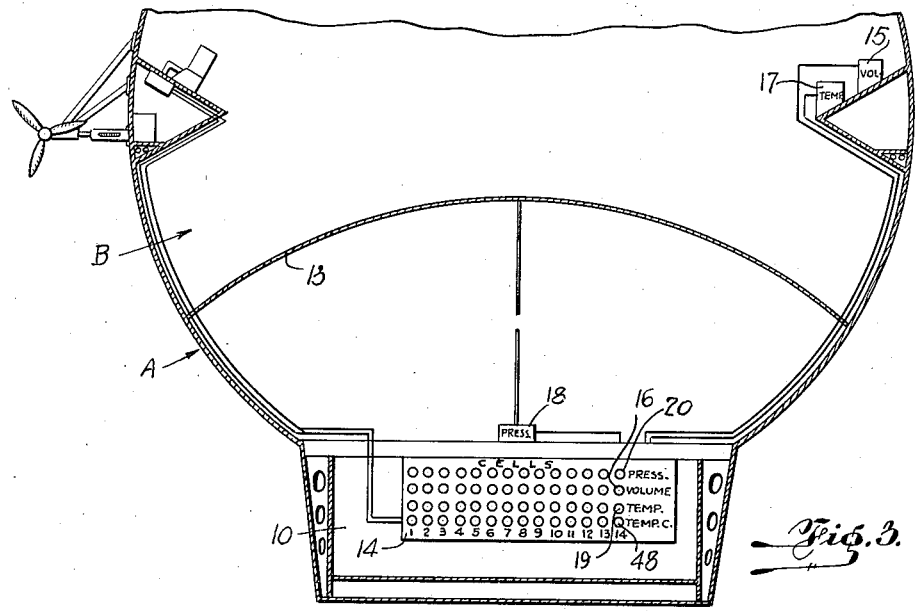
Fig. 3 is a broken cross-sectional view of an aircraft showing an application of the invention thereto.
Figure 2:
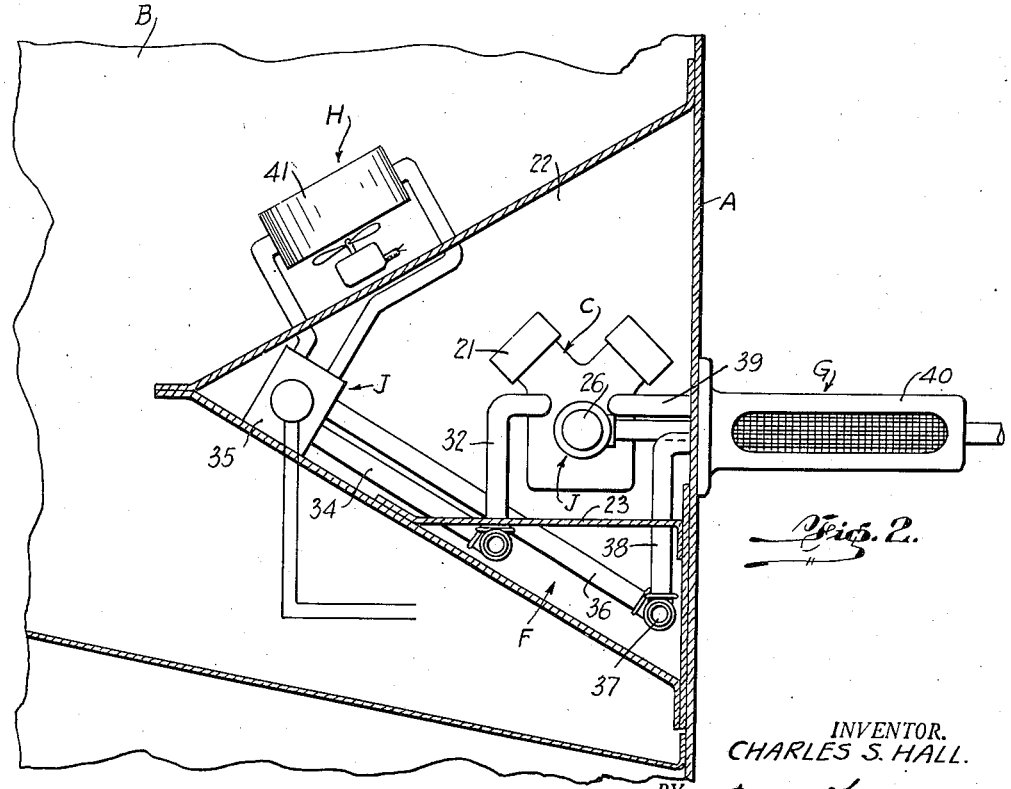
Fig. 2 is a fragmentary end sectional view thereof.

In that embodiment of the invention which is

2 illustrated, the aircraft may be said to comprise generally an outer casing or skin A; a plurality of gas cells B disposed therein; motive power means such as an engine C of a plurality of engines; propulsion means D for said aircraft and operated by the engines C; a condenser E for the exhaust gases of each engine; an engine coolant system F; a cooling device G for said coolant; heating means H for the gas in the cells B; control means J for selectively directing the coolant liquid to either the means G or the means H; and various parts, elements, etc. which will be later described.

The skin A of the aircraft may be of the stressed metal type substantially round in cross-section and of elongated tapered shape. The craft may be provided with a cabin portion 10 and be structurally formed to be rigid.

The gas cells B, of which cells 11 and 12 are shown, may comprise the major portion of the volume of the craft, each cell being preferably provided with a diaphragm wall 13 whereby expansion and contraction of the gas and, consequently, the volume of the gas in each cell, may be indicated on means such as a panel board 14 located in the cabin 10. For this purpose, a volume responsive instrument 15 may be placed in each gas cell and connected to a respective volume indicating instrument 16 on said panel board. Temperature responsive instruments 17 and pressure responsive devices 18 may each also be connected to respective indicating means 19 and 20.

The motive power means C may comprise a plurality of internal combustion engines, one of which is shown at 21. Said engines are preferably arranged in a line on either side of the craft and, for ready access are enclosed in gangways or the like 22 in which a cat-walk 23 is provided.

Each engine 21 may be connected to operate the propulsion means D which comprises a propeller 24 including blade feathering mechanism 25, and propeller swiveling gear 26 which operates, through the medium of a swivel torque tube 27, to rotate the swiveling head 28. Means, such as the struts 29 may serve to support the propellers outboard of the aircraft in an apparent manner.

Each engine may be connected by exhaust pipes 30 to the condenser E which comprises a water recovery cell 31. The latter recovers the water products of combustion in the engine 21 and also the moisture in the surrounding atmosphere to provide ballast for the aircraft. The recovery cell 31 releases non-condensing products of combustion in atmosphere.

The coolant system F comprises a coolant liquid circulating series of tubes or pipes, the pipe 32 conducting heated coolant to a manifold pipe 33 from which a pipe 34 conducts the coolant to a solenoid operated valve 35 which comprises part of the control means J. Said valve 35 may conduct the coolant either to the gas cell heating means H or to a pipe 36 leading to another manifold pipe 37. From the latter pipe the coolant is conducted by a pipe 38 to the cooling device G. A return pipe 39 returns the cooled coolant liquid to the engine 21.

The cooling device G may comprise a radiator 40 which is positioned externally of the craft and is preferably arranged around the propeller driving members for the purpose of a compact assembly. The liquid contemplated to be used in the present case is one sold under the name "Glycol." However, other suitable coolant liquids may be employed.

The gas cell heating means H may comprise a system of circulating tubes or pipes connected with the valve means J and with one or more heaters 41 located in each respective cell 11, 12, etc. The circulating tubes may comprise a tube or tubes 42 conducting coolant from the valve to said heaters and a tube or tubes 43 returning the coolant from the heaters to the valve. Means such as fans 44 may be used for establishing a circulation of the gas in the cells through the heaters 41 so that an exchange of heat may be effected.

Other elements and essential devices which are illustrated may include a carburetor air intake 45 and an exhaust manifold 46.

The structure is arranged so that the engine 21 circulates its coolant liquid through the manifold pipes 33 and 37, these pipes, in turn, are connected to a valve 35 for each of a plurality of gas cells, and each valve controls the flow of coolant through the heating means H of its gas cell.

When heating of the cells is not desired, control means, connected to the electric conductors 47 may be operated to condition the valve 35 so that coolant may flow through the pipe 34 into the valve 35 and out through the pipe 36. The following coolant liquid circuit is established. From the motor, through pipes 32, 33 and 34, into valve 35, through pipes 36, 37 and 38 into radiator 40 and through pipe 39 back into the engine 21.

Should heating be desired in any gas cell, the valve 35 may be conditioned to establish the following circuit. Engine 21, pipes 32, 33 and 34, valve 35, tubing 42, heaters 41, tubing 43, valve 35, pipes 36, 37 and 38, radiator 40, pipe 39, and finally engine 21.

Since control of each valve 35 may be provided for on the panel 14 as at 48 (Fig. 3), each cell may be heated when conditions warrant.

This system of gas heating provides a method of buoyancy control of an aircraft. By utilizing an original volume of gas of sufficient quantity to provide the desired buoyancy at atmospheric temperature, a control of lift can be maintained by balancing the heat input into the gas cells and the heat loss from the gas cells by radiation through the aircraft's skin. The gas heaters are located in each of the gas cells and are supplied by the coolant liquid from the several engines through the described manifold pipes.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications that may fall within the scope of the appended claims.

What I claim as new and desire to secure by Letters Patent, is:

1. In lighter-than-air craft, a plurality of gas-containing cells, motive power means for said craft including a plurality of engines, a coolant liquid system for said engine, said coolant system comprising coolant circulating pipes, a cooling device, heating means located in each gas-containing cell, and a valve in said system and operable to selectively direct the flow of coolant liquid in the pipes through the cooling device only, or through the heating means and the cooling device.

2. In lighter-than-air craft, a plurality of gas-containing cells, motive power means for said craft including a plurality of engines, a coolant liquid system for said engine, said coolant system comprising coolant circulating pipes, a cooling device, heating means located in each gas-containing cell, and a valve in said system and operable to selectively direct the flow of coolant liquid in the pipes through the cooling device only, or through the heating means and the cooling device, said valve comprising a remotely controlled electrically operated unit.

3. In lighter-than-air craft, an engine, flow pipes for the coolant liquid of the engine, a cooling device connected with said pipes for cooling the coolant liquid flowing in said pipes, a plurality of heater means, and a plurality of valves each connecting one heater means and said flow pipes, said valves being each separately operable to direct coolant liquid first to the respective heater means and then to the cooling device.

CHARLES S. HALL.

REFERENCES CITED

The following references are of record in the file of this patent:

UNITED STATES PATENTS

| Number | Name | Date |
|---|---|---|
| 1,092,611 | Upson | Apr. 7, 1914 |
| 1,509,527 | Parker | Sept. 23, 1924 |
| 1,576,859 | Sieck | Mar. 16, 1926 |
| 2,310,767 | Durr | Feb. 9, 1943 |